US009786898B2

(12) United States Patent
Heo

(10) Patent No.: US 9,786,898 B2
(45) Date of Patent: Oct. 10, 2017

(54) SECONDARY BATTERY AND SECONDARY BATTERY ARRAY

(71) Applicant: Samsung SDI Co., Ltd., Yongin-si, Gyeonggi-do (KR)

(72) Inventor: Sangdo Heo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 83 days.

(21) Appl. No.: 14/795,356

(22) Filed: Jul. 9, 2015

(65) Prior Publication Data

US 2016/0204410 A1 Jul. 14, 2016

(30) Foreign Application Priority Data

Jan. 13, 2015 (KR) ........................ 10-2015-0006110

(51) Int. Cl.

| | |
|---|---|
| ***H01M 2/30*** | (2006.01) |
| ***H01M 2/10*** | (2006.01) |
| ***H01M 2/20*** | (2006.01) |
| ***H01M 10/04*** | (2006.01) |
| *H01M 2/02* | (2006.01) |

(52) U.S. Cl.

CPC ........... *H01M 2/30* (2013.01); *H01M 2/1061* (2013.01); *H01M 2/1077* (2013.01); *H01M 2/202* (2013.01); *H01M 10/0413* (2013.01); *H01M 10/0436* (2013.01); *H01M 2/021* (2013.01); *H01M 2/024* (2013.01)

(58) Field of Classification Search

CPC ...... H01M 2/30; H01M 2/202; H01M 2/1077; H01M 2/1061; H01M 2/024; H01M 2/021; H01M 10/0436; H01M 10/0413

See application file for complete search history.

(56) References Cited

U.S. PATENT DOCUMENTS

2002/0061443 A1* 5/2002 Nakanishi ............. H01M 4/131 429/223
2005/0260491 A1* 11/2005 Cho ...................... H01M 2/021 429/178

(Continued)

FOREIGN PATENT DOCUMENTS

KR 10-2009-0010444 A 1/2009
KR 10-2009-0062965 A 6/2009

(Continued)

*Primary Examiner* — Patrick Ryan
*Assistant Examiner* — Aaron Greso
(74) *Attorney, Agent, or Firm* — Knobbe Martens Olson & Bear LLP

(57) ABSTRACT

A secondary battery and a secondary battery array are disclosed. In one aspect, the secondary battery includes an electrode assembly and a battery case accommodating the electrode assembly. The battery also includes a plurality of lead terminals comprising a first pair of lead terminals having opposite polarities and outwardly extending from the electrode assembly to protrude from a first side of the battery case and a second pair of lead terminals having opposite polarities and outwardly extending from the electrode assembly to protrude from a second side of the battery case opposing the first side. The battery further includes a plurality of insulation members respectively extending along the first and second pairs of lead terminals to at least partially cover the lead terminals.

21 Claims, 6 Drawing Sheets

(56) References Cited

U.S. PATENT DOCUMENTS

2005/0287430 A1* 12/2005 Kim ........................ H01M 2/06
429/161
2011/0262245 A1* 10/2011 Michiwaki ............ F16B 33/006
411/412
2012/0196169 A1 8/2012 Jeong et al.

FOREIGN PATENT DOCUMENTS

KR 10-2012-0087004 A 8/2012
KR 10-2014-0009047 A 1/2014

* cited by examiner 110
195
191
192
193
191
OP
192

FRONT
RIGHT
REAR
LEFT
C1
C2
112
112
111
111
191
192
193
195
191
192
193
195
191
191
192
OP
192 OP

SECONDARY BATTERY AND SECONDARY BATTERY ARRAY

RELATED APPLICATION

This application claims the benefit of Korean Patent Application No. 10-2015-0006110, filed on Jan. 13, 2015, in the Korean Intellectual Property Office, the disclosure of which is incorporated herein in its entirety by reference.

BACKGROUND

Field

The described technology generally relates to a secondary battery and a secondary battery array.

Description of the Related Technology

Unlike primary batteries, secondary batteries are rechargeable. Secondary batteries are used as energy sources in a variety of applications such as mobile devices, electric vehicles, hybrid electric vehicles, electric bicycles, and uninterruptible power supplies. A single secondary battery cell or a secondary battery pack in which multiple secondary batteries are connected to each other is used according to the power needs, type or shape of an application device.

Recently, the interior spaces of electronic devices have been efficiently used to reduce the sizes of the electronic devices, and thus demand for secondary batteries configured to be placed in curved inner spaces of the devices has increased. In addition, since the use of secondary batteries has been extended to electronic devices having various shapes, demand for secondary batteries having various shapes, including polygonal shapes, has increased.

SUMMARY OF CERTAIN INVENTIVE ASPECTS

One inventive aspect relates to a secondary battery and a secondary battery array including a plurality of secondary batteries connected to each other.

Another aspect is a secondary battery and a secondary battery array having a simple structure for connecting two or more secondary batteries.

Another aspect is a secondary battery and a secondary battery array having a simple structure for connecting two or more secondary batteries in various shapes.

Another aspect is a secondary battery that includes: an electrode assembly; a battery case accommodating the electrode assembly; lead terminals including a pair of first and second lead terminals having opposite polarities and extending from the electrode assembly across the battery case in a front direction of the battery case and a pair of first and second lead terminals having opposite polarities and extending from the electrode assembly across the battery case in a rear direction of the battery case; and insulation members extending along the lead terminals to cover the lead terminals.

Openings may be formed in the insulation members and expose end portions of the lead terminals.

Sides of the openings may be opened at ends of the lead terminals.

Sides of the openings that are opposite the opened sides may be round in a semicircular shape.

Position alignment portions may be formed on the lead terminals extending outward from the battery case.

The position alignment portions may have a hole shape.

Another aspect is a secondary battery array that includes first and second secondary batteries that are electrically connected to each other by coupling together lead terminals extending from the first and second secondary batteries in mutually-facing directions, wherein each of the first and second secondary batteries includes insulation members extending along the lead terminals to surround the lead terminals, and openings are formed in the insulation members and expose end portions of the lead terminals, wherein the lead terminals are coupled by coupling together the end portions of the lead terminals exposed through the openings.

The lead terminals may include pairs of first and second lead terminals having opposite polarities, the pairs extending respectively from the first and second secondary batteries in the mutually-facing directions.

The lead terminals may further include pairs of first and second lead terminals having opposite polarities, the pairs extending respectively from the first and second secondary batteries in directions opposite the mutually-facing directions.

The first and second lead terminals of the first secondary battery are respectively and electrically connected to the first and second lead terminals of the second secondary battery that extend in a direction facing the first and second lead terminals of the first secondary battery.

Each of the first and second secondary batteries may include: an electrode assembly electrically connected to the first and second lead terminals; and first and second cases facing each other and coupled to each other for accommodating the electrode assembly, wherein the first and second secondary batteries may be oriented such that the first cases of the first and second secondary batteries face the same direction.

The first and second lead terminals of the first secondary battery may be respectively and electrically connected to the second and first lead terminals of the second secondary battery that extend in a direction facing the first and second lead terminals of the first secondary battery.

Each of the first and second secondary batteries may include: an electrode assembly electrically connected to the first and second lead terminals; and first and second cases facing each other and coupled to each other for accommodating the electrode assembly, wherein the first and second secondary batteries may be oriented such that the first cases of the first and second secondary batteries face opposite directions.

End portions of the lead terminals extending from the first and second secondary batteries may overlap each other and may be welded together.

Position alignment portions may be formed on the lead terminals extending from the first and second secondary batteries for aligning positions of the lead terminals.

Another aspect is a secondary battery comprising: an electrode assembly; a battery case accommodating the electrode assembly; a plurality of lead terminals comprising a first pair of lead terminals having opposite polarities and outwardly extending from the electrode assembly to protrude from a first side of the battery case and a second pair of lead terminals having opposite polarities and outwardly extending from the electrode assembly to protrude from a second side of the battery case opposing the first side; and a plurality of insulation members respectively extending along the first and second pairs of lead terminals to at least partially cover the lead terminals.

In the above battery, a plurality of openings are formed in the insulation members and expose end portions of the lead terminals. In the above battery, a plurality of first sides of the openings are opened at ends of the lead terminals. In the above battery, a plurality of second sides of the openings that are opposite the opened first sides have a semicircular shape. In the above battery, a plurality of position alignment portions are respectively formed on the lead terminals, and wherein each of the position alignment portions is smaller in size than the corresponding opening.

In the above battery, each of the position alignment portions is closer to the battery case than the corresponding opening. In the above battery, a plurality of position alignment portions are respectively formed on the lead terminals. In the above battery, a cross-section of each of the position alignment portions has a polygonal shape. In the above battery, each of the insulation members covers the majority of the area of the corresponding lead terminal.

Another aspect is a secondary battery array comprising: first and second secondary batteries each including a plurality of first lead terminals, wherein the first and second secondary batteries are electrically connected to each other via the first lead terminals, wherein each of the first and second secondary batteries further comprises a plurality of first insulation members respectively extending along the first lead terminals to at least partially surround the first lead terminals.

In the above battery, a plurality of openings are respectively formed in the first insulation members and expose end portions of the first lead terminals. In the above battery, the lead terminals of the first and second secondary batteries are connected to each other via the end portions thereof. In the above battery, the lead terminals of the first secondary battery comprise a first pair of lead terminals having opposite polarities, wherein the lead terminals of the second secondary battery comprise a second pair of lead terminals having opposite polarities, and wherein the first and second pairs of lead terminals extend in mutually-facing directions. In the above battery, each of the first and second secondary batteries further comprises: an electrode assembly electrically connected to the corresponding pair of lead terminals; and first and second cases facing each other and connected to each other and accommodating the electrode assembly, wherein the first and second secondary batteries are oriented such that the first cases of the first and second secondary batteries face the same direction.

In the above battery, end portions of the first lead terminals extending from the first and second secondary batteries overlap each other and are welded together. In the above battery, a plurality of position alignment portions are respectively formed on the first lead terminals so as to align positions of the first lead terminals. The above battery further comprises a third secondary battery including a plurality of second lead terminals, wherein the first secondary battery further comprises a plurality of third lead terminals opposing the first lead terminals thereof, and wherein the first and third second batteries are electrically connected to each other via the second and third lead terminals. In the above battery, the third secondary battery comprises a plurality of second insulation members respectively extending along the second lead terminals to at least partially surround the second lead terminals.

Another aspect is a secondary battery comprising: an electrode assembly; a battery case accommodating the electrode assembly; a plurality of lead terminals comprising at least one first lead terminal outwardly extending from the electrode assembly to protrude from a first side of the battery case and at least one second lead terminal outwardly extending from the electrode assembly to protrude from a second side of the battery case opposing the first side; and a plurality of insulation members respectively extending along the first and second lead terminals to at least partially cover the first and second lead terminals.

In the above battery, a plurality of openings are formed in the insulation members and expose end portions of the first and second lead terminals. Brief Description of the Drawings These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Figure 1:
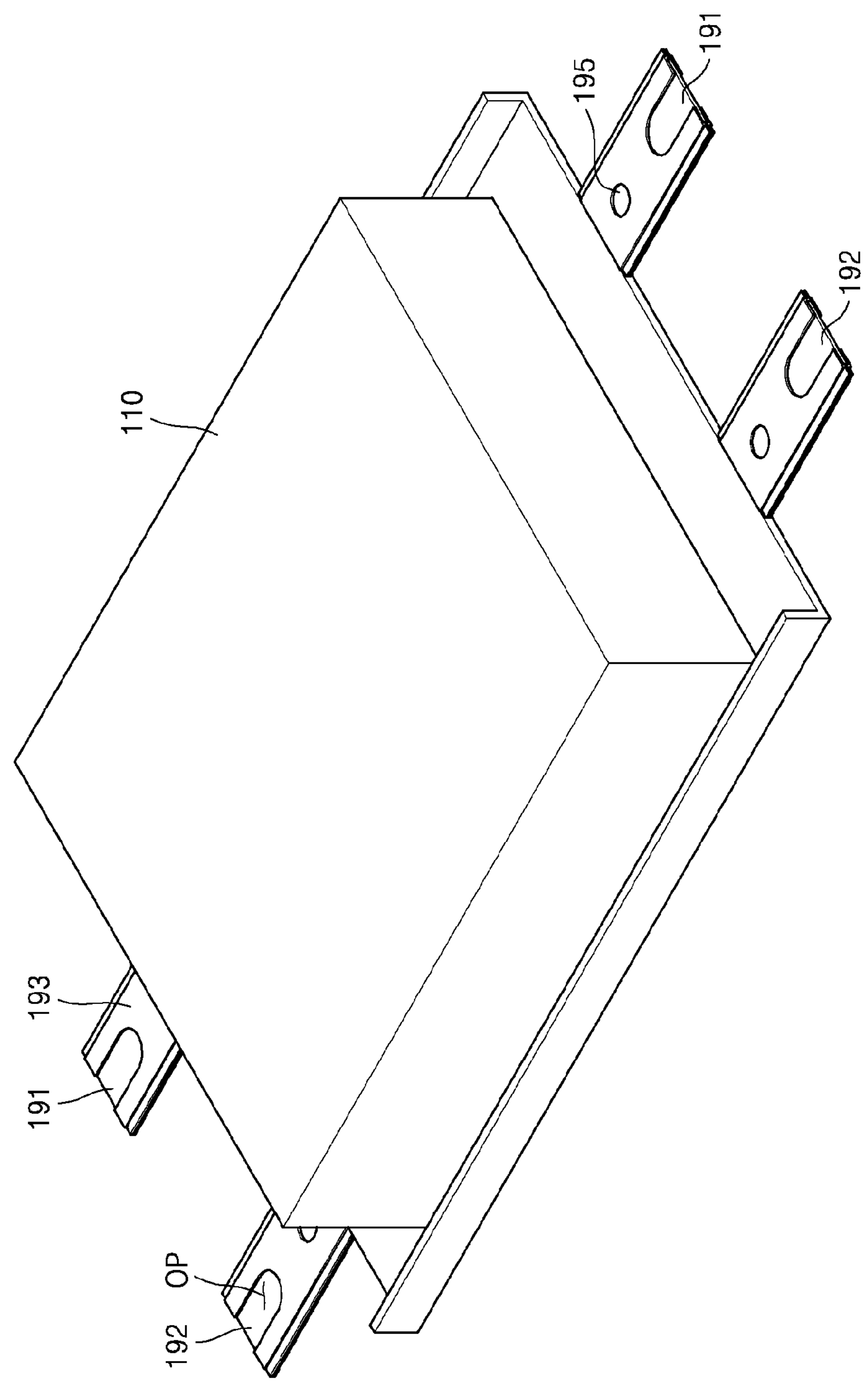
FIG. 1 is a perspective view illustrating a secondary battery according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a secondary battery and a secondary battery array will be described in detail with reference to the accompanying drawings, in which exemplary embodiments are shown. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Figure 2:
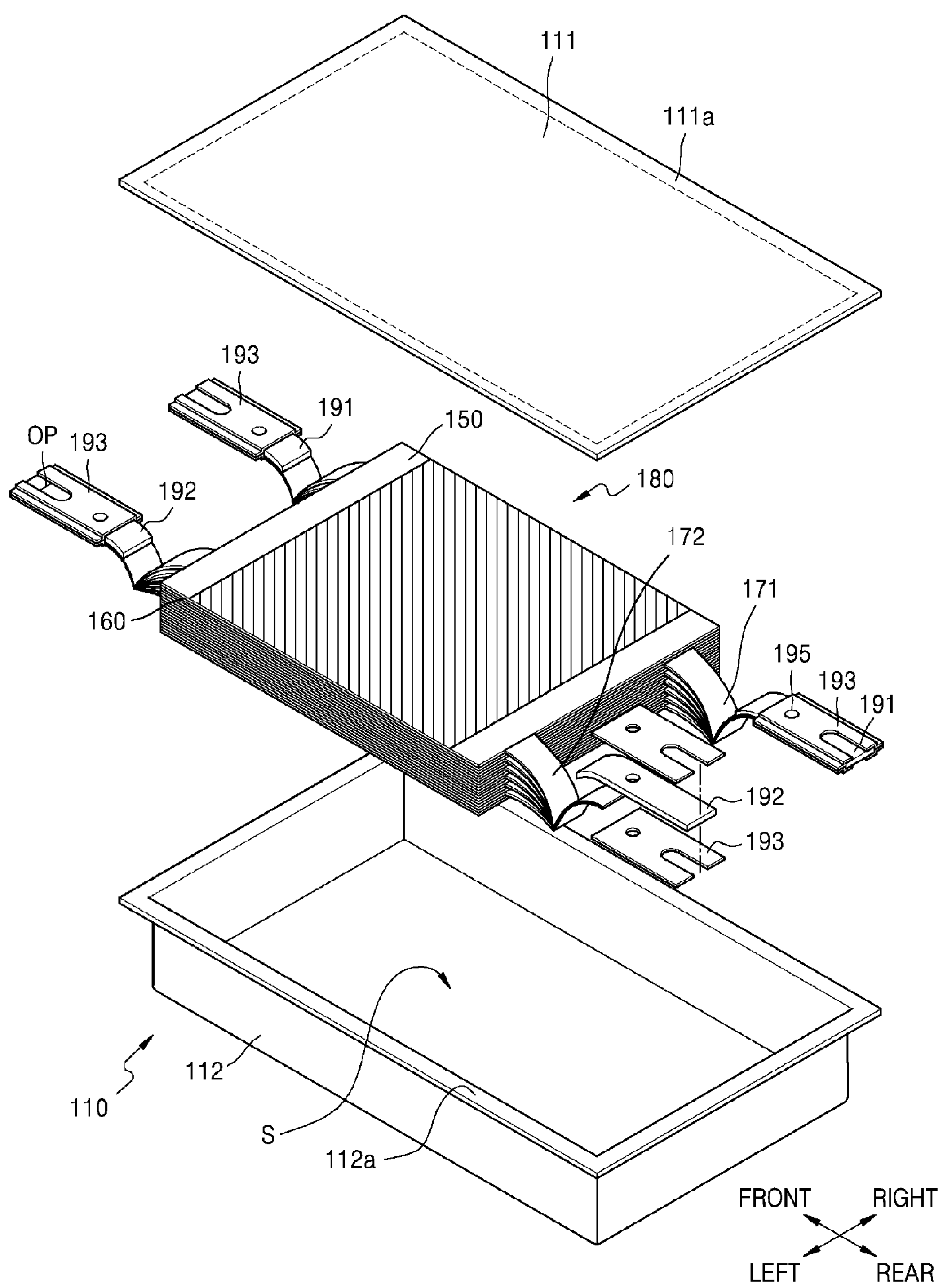
FIG. 2 is an exploded perspective view illustrating the secondary battery illustrated in FIG. 1.
Figure 3:
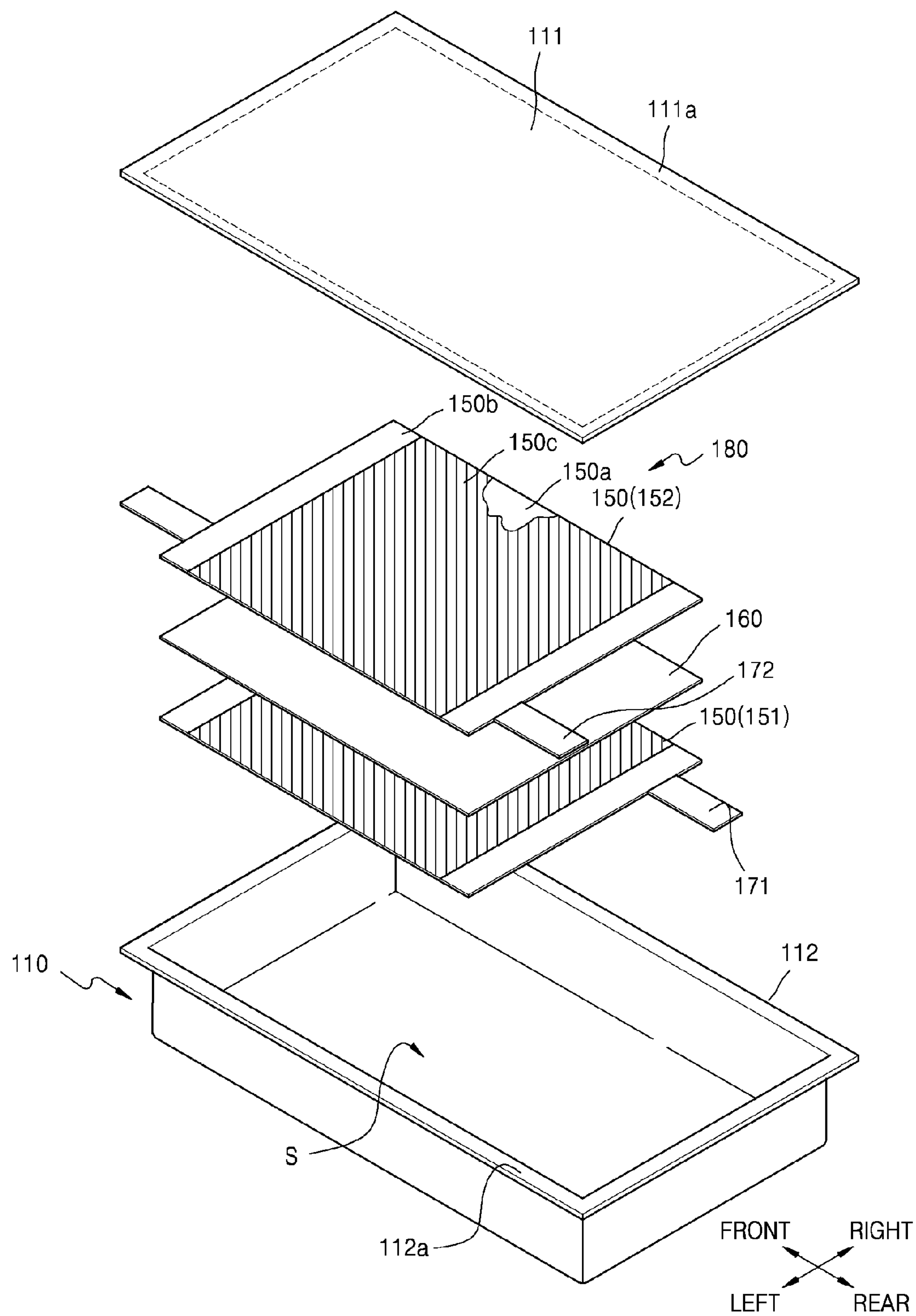
FIG. 3 is an exploded perspective view illustrating an electrode assembly illustrated in FIG. 2.

FIG. 1 is a perspective view illustrating a secondary battery according to an exemplary embodiment. FIG. 2 is an exploded perspective view illustrating the secondary battery illustrated in FIG. 1. FIG. 3 is an exploded perspective view illustrating an electrode assembly 180 illustrated in FIG. 2.

Referring to FIGS. 1 and 2, the secondary battery includes the electrode assembly 180, first and second electrode tabs 171 and 172 extending from the electrode assembly 180, first and second lead terminals 191 and 192 electrically connected to the first and second electrode tabs 171 and 172, and a battery case 110 accommodating the electrode assembly 180.

Referring to FIG. 3, first and second electrode plates 151 and 152 may be sequentially stacked with a separator 160 being disposed therebetween to form the electrode assembly 180. For example, the first electrode plate 151, the separator 160, and the second electrode plate 152 may be cut into predetermined sizes and sequentially stacked to form the electrode assembly 180 having a stacked structure. In this case, the capacity of the secondary battery may be easily increased by increasing the number of the first and second electrode plates 151 and 152 when the electrode assembly 180 is formed into a stacked structure. A plurality of first electrode plates 151 and a plurality of second electrode plates 152 may be stacked, or a larger first electrode plate 151 and a larger second electrode plate 152 may be stacked, so as to increase the discharge capacity of the electrode assembly 180.

However, the electrode assembly 180 is not limited to the above-described stacked structure. For example, the electrode assembly 180 may be fabricated to have a wound structure (roll-type) by winding sheet-shaped first and second electrode plates 151 and 152 between which the separator 160 is placed. In this case, the electrode assembly 180 may be formed by disposing the separator 160 between the first and second electrode plates 151 and 152 coated with electrode active materials to separate the electrode plates 151 and 152, and winding the electrode plates 151 and 152 and the separator 160 in the form of a jelly-roll. The jelly-roll-type electrode assembly 180 may have a circular cylindrical shape or may be pressed flat through a pressing process so that the jelly-roll type electrode assembly 180 may have an elliptical cross-section.

Each of the electrode plates 150 may be formed by applying an active material to a surface of an electrode collector 150*a*. In this case, each of the electrode plates 150 may include the electrode collector 150*a* and an active material layer 150*c* formed on at least a surface of the electrode collector 150*a*. For example, the first and second electrode plates 151 and 152 may be a positive electrode plate and a negative electrode plate, respectively. In this case, the first electrode plate 151 may include a positive electrode collector and a positive electrode active material layer formed on at least a surface of the positive electrode collector, and the second electrode plate 152 may include a negative electrode collector and a negative electrode active material layer formed on at least a surface of the negative electrode collector.

The electrode plates 150 may include non-coated portions 150*b* on which the active material layers 150*c* are not formed. The first and second electrode tabs 171 and 172 may be electrically connected to the non-coated portions 150*b*. For example, the first and second electrode tabs 171 and 172 may be electrically connected to the first and second electrode plates 151 and 152 through non-coated portions 150*b* of the first and second electrode plates 151 and 152, respectively. The first and second electrode tabs 171 and 172 may be connected to the non-coated portions 150*b* by resistance welding, ultrasonic welding, or laser welding.

The first and second electrode tabs 171 and 172 may be formed of a metallic material having high conductivity. For example, the first and second electrode tabs 171 and 172 may be positive and negative electrode tabs, respectively. The first electrode tabs 171 may be formed of a metallic material such as aluminum or nickel, and the second electrode tabs 172 may be formed of a metallic material such as copper or nickel.

As shown in FIG. 2, the first and second electrode tabs 171 and 172 extending from the stacked electrode plates 150 overlap each other and are electrically connected to the first and second lead terminals 191 and 192. The first and second lead terminals 191 and 192 may continuously extend from the first and second electrode tabs 171 and 172 to the outside of the battery case 110. For example, the first and second electrode tabs 171 and 172 and the first and second lead terminals 191 and 192 may be coupled to each other by a method such as an ultrasonic welding method.

The first lead terminals 191 may be coupled to groups of the first electrode tabs 171 and extend from the groups of the first electrode tabs 171, and second lead terminals 192 may be coupled to groups of the second electrode tabs 172 and extend from the groups of the second electrode tabs 172. The first and second lead terminals 191 and 192 may have opposite polarities. For example, the first and second lead terminals 191 and 192 may have positive and negative polarities, respectively.

The battery case 110 provides an accommodation space S in which the electrode assembly 180 is placed. The battery case 110 insulates and protects the electrode assembly 180 from external environments. The battery case 110 may include an exterior material formed by attaching resin sheets to both sides of metal foil. For example, the battery case 110 includes an aluminum lamination sheet.

The battery case 110 may include first and second cases 111 and 112 forming the accommodation space S for accommodating the electrode assembly 180, and the electrode assembly 180 may be sealed by disposing the electrode assembly 180 between the first and second cases 111 and 112 and joining the cases 111 and 112 together. For example, mutually-facing sealing portions 111*a* and 112*a* of the first and second cases 111 and 112 are thermally fused to each other to seal the electrode assembly 180 and an electrolyte (not shown) disposed inside the first and second cases 111 and 112. The battery case 110 may seal the electrode assembly 180 and the electrolyte (not shown) in a state where at least portions of the first and second lead terminals 191 and 192 are exposed to the outside.

The first and second lead terminals 191 and 192 may extend from the electrode assembly 180 to the outside of the battery case 110 across the battery case 110. In this state, the first and second lead terminals 191 and 192 may be insulated from the battery case 110 and may extend to the outside of the battery case 110 across the battery case 110. Insulation members 193 may be formed between the battery case 110 and the first and second lead terminals 191 and 192 for electric insulation therebetween. The insulation members 193 may be formed on the first and second lead terminals 191 and 192 along extension directions of the first and second lead terminals 191 and 192. Crossing portions of the battery case 110 and the first and second lead terminals 191 and 192 are in contact with each other with the insulation members 193 being formed therebetween. The insulation members 193 may allow the first and second lead terminals 191 and 192 and the battery case 110 to make tight contact with each other so as to guarantee secure sealing of the battery case 110.

The first and second lead terminals 191 and 192 may extend to the outside through the sealing portions 111*a* and 112*a* of the first and second cases 111 and 112, and when the sealing portions 111*a* and 112*a* of the first and second cases 111 and 112 are formed to face each other and thermally fused to each other for sealing the first and second cases 111 and 112, the first and second lead terminals 191 and 192 may be formed between the first and second cases 111 and 112 so that portions of the first and second lead terminals 191 and 192 may be exposed to the outside (e.g., environment). At this time, the first and second lead terminals 191 and 192 may extend to the outside of the battery case 110 across the sealing portions 111*a* and 112*a* of the battery case 110. In this case, the insulation members 193 may be formed between the crossing portions of the battery case 110 (specifically, the sealing portions 111*a* and 112*a* of the battery case 110) and the first and second lead terminals 191 and 192 for electrically insulating the first and second lead terminals 191 and 192 from the battery case 110. In addition, since the first and second lead terminals 191 and 192 and the battery case 110 are brought into tight contact with each other owing to the insulation members 193 formed therebetween, the battery case 110 may be reliably sealed.

The insulation members 193 may extend in the length directions of the first and second lead terminals 191 and 192 and may be exposed to the outside of the battery case 110. The insulation members 193 may be exposed to the outside of the battery case 110 so as to insulate the first and second lead terminals 191 and 192 from external environments. The secondary battery may include neighboring first and second lead terminals 191 and 192 that have opposite polarities. For example, although the neighboring first and second lead terminals 191 and 192 are brought into contact with each other, since the insulation members 193 surround the first and second lead terminals 191 and 192, an electric short circuit may not be formed.

The secondary battery may be coupled to another secondary battery to form a secondary battery array having large electric output power, and in this case, insulation members 193 of the secondary batteries may extend to the outside of battery cases 110 in the length directions of first and second lead terminals 191 and 192 for preventing an electric short circuit between the secondary batteries. For example, the insulation members 193 may completely cover all extension lengths of the first and second lead terminals 191 and 192 extending outward from the battery case 110.

Openings OP may be formed in end portions of the insulation members 193 in extension directions of the insulation members 193. The openings OP expose the first and second lead terminals 191 and 192 therethrough. That is, portions of the first and second lead terminals 191 and 192 are exposed to the outside through the openings OP, and thus the secondary battery may be electrically connected to another secondary battery through the exposed portions of the first and second lead terminals 191 and 192.

The openings OP may be sized and shaped for forming coupling portions (for example, welding portions) between secondary batteries and may be opened toward the outside. For example, sides of the openings OP may be opened to the outside and the other sides thereof have a round shape.

As described later, first and second lead terminals 191 and 192 of neighboring secondary batteries exposed through openings OP may be placed to overlap each other and then be welded together so as to electrically connect the neighboring secondary batteries.

The insulation members 193 may protect the first and second lead terminals 191 and 192 to prevent the first and second lead terminals 191 and 192 from being physically damaged. As described later, a secondary battery array including two or more electrically-connected secondary batteries may be formed in a curved shape (or non-linear shape) by bending first and second lead terminals 191 and 192 of neighboring secondary batteries. That is, a secondary battery array may be formed in a curved shape by deforming first and second lead terminals 191 and 192 instead of deforming electrode assemblies 180 directly related to output performance, and thus, the secondary battery array may have a desired shape without a decrease in the electric output performance thereof.

The first and second lead terminals 191 and 192 may be considerably deformed to obtain a desired shape and thus may be cracked or damaged. The insulation members 193 surrounding the first and second lead terminals 191 and 192 may distribute stress and prevent excessive local deformation to induce uniform deformation over a wide area.

The insulation members 193 may be pieces of insulation tape attached to the first and second lead terminals 191 and 192 to surround the first and second lead terminals 191 and 192. For example, the insulation members 193 may be formed of an insulation material such as polyphenylene ether (PPE). For example, the insulation members 193 may be attached to the first and second lead terminals 191 and 192 to surround the first and second lead terminals 191 and 192 by disposing the insulation members 193 to face each other with the first and second lead terminals 191 and 192 being disposed therebetween, and joining the insulation members 193 together.

Position alignment portions 195 may be formed on the first and second lead terminals 191 and 192. The position alignment portions 195 may be formed on portions of the first and second lead terminals 191 and 192 exposed to the outside of the battery case 110. In some embodiments, as shown in FIG. 2, the position alignment portions 195 have a hole shape. In a secondary battery array, in which neighboring secondary batteries are electrically connected to each other, the position alignment portions 195 may make it easy to align the secondary batteries. For example, the first and second lead terminals 191 and 192 of neighboring first and second secondary batteries may be disposed to overlap each other and may be welded together. In this case, the position alignment portions 195 formed on the first and second lead terminals 191 and 192 may be used to easily align the first and second secondary batteries. For example, mechanical alignment guides (not shown) may be inserted into the position alignment portions 195 having a hole shape for position alignment, or light may be emitted through the position alignment portions 195 for position alignment.

In the exemplary embodiment, the first and second lead terminals 191 and 192 may extend from the battery case 110 in both directions. That is, the first and second lead terminals 191 and 192 may extend in front and rear directions of the battery case 110. For example, the first and second lead terminals 191 and 192 include a pair of first and second lead terminals 191 and 192 having opposite polarities and extending in the front direction of the battery case 110, and a pair of first and second lead terminals 191 and 192 having opposite polarities and extending in the rear direction of the battery case 110.

In the exemplary embodiment shown in FIGS. 1 and 2, the first lead terminals 191 or the second lead terminals 192 may be formed on the same half side of the secondary battery. For example, in the exemplary embodiment shown in FIGS. 1 and 2, the first lead terminals 191 are formed on the right side of the battery case 110, and the second lead terminals 192 are formed on the left side of the battery case 110. In this structure, the secondary battery may symmetrically have the same polarity on front and rear sides thereof.

In another exemplary embodiment, the first and second lead terminals 191 and 192 are formed on the front and rear sides of the secondary battery in a crossing manner. For example, neighboring secondary batteries are electrically connected in series or parallel by variously disposing the first and second lead terminals 191 and 192 having opposite polarities.

In the present specification, the front and rear directions and left and right directions are axial directions that substantially perpendicularly cross each other. For example, the front and rear directions may be substantially parallel with a relatively long length of the secondary battery, and the left and right directions may be substantially parallel with a relatively short width of the secondary battery. However, in the exemplary embodiments of the present disclosure, the front and rear directions and the left and right directions are not limited thereto.

Figure 4:
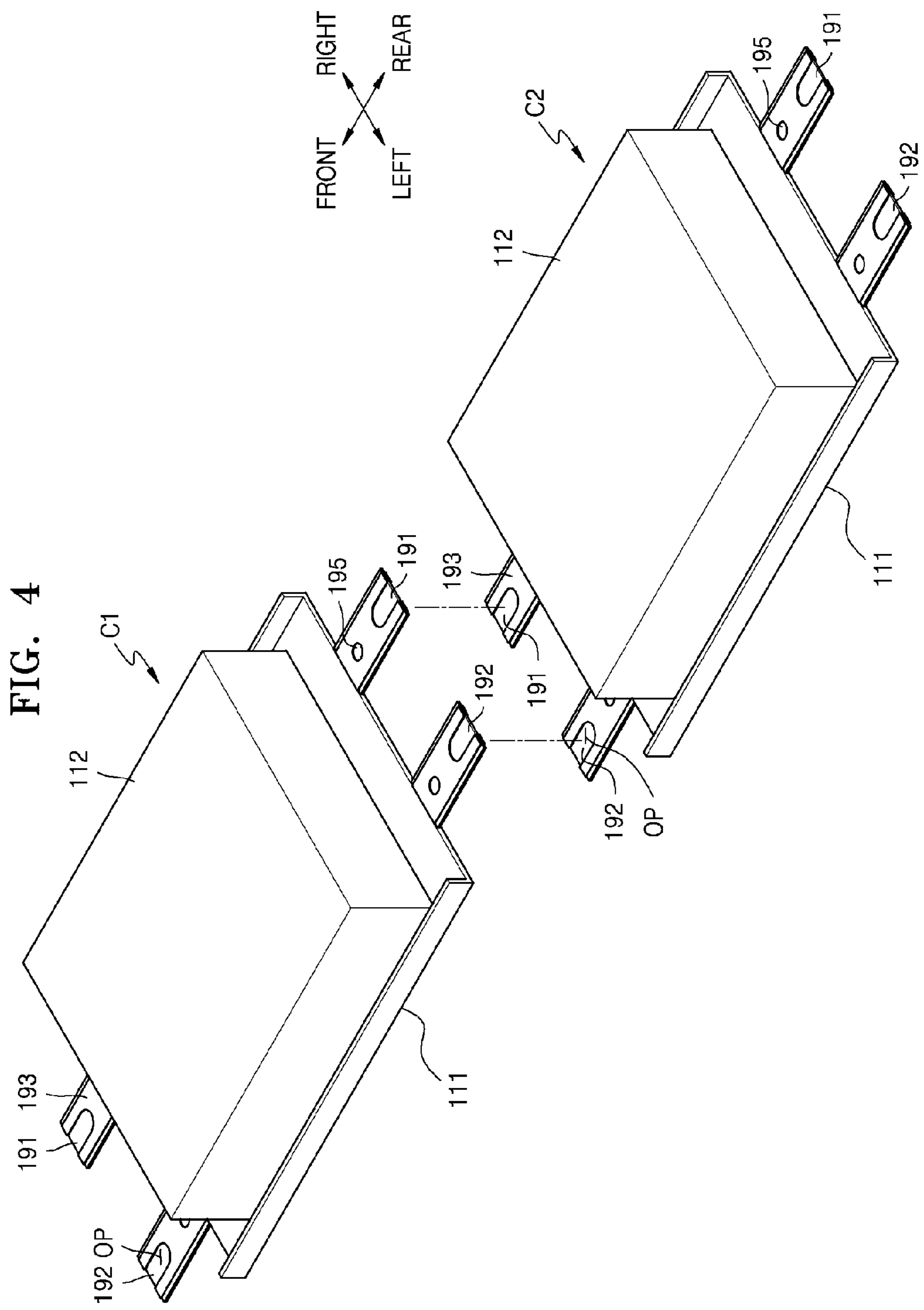
FIG. 4 is a view illustrating a secondary battery array according to an exemplary embodiment.

FIG. 4 is a view illustrating a secondary battery array according to an exemplary embodiment. Referring to FIG. 4, the secondary battery array includes a plurality of secondary batteries that are electrically connected to each other. For example, the secondary battery array may include neighboring first and second secondary batteries C1 and C2 that are electrically connected to each other. The first and second secondary batteries C1 and C2 may each have the same structure as the structure of the secondary battery illustrated in FIGS. 1 to 3. That is, each of the first and second secondary batteries C1 and C2 may include pairs of first and second lead terminals 191 and 192 extending in opposite directions. As described later, the first and second secondary batteries C1 and C2 may be electrically connected to each other by coupling together first and second lead terminals 191 and 192 extending from the first and second secondary batteries C1 and C2 in mutually-facing directions.

For example, each of the first and second secondary batteries C1 and C2 includes pairs of first and second lead terminals 191 and 192 extending in opposite directions. The first and second secondary batteries C1 and C2 may include: pairs of first and second lead terminals 191 and 192 extending therefrom in mutually facing directions; and pairs of first and second lead terminals 191 and 192 extending therefrom in directions opposite the mutually-facing directions. The first and second secondary batteries C1 and C2 may be electrically connected to each other by coupling together the first and second lead terminals 191 and 192 extending in the mutually-facing directions.

Insulation members 193 may cover the first and second lead terminals 191 and 192 along the lengths of the first and second lead terminals 191 and 192, and openings OP may be formed in ends of the insulation members 193. The openings OP are formed for electric connection between the neighboring first and second secondary batteries C1 and C2. That is, the openings OP expose the first and second lead terminals 191 and 192, and exposed portions of the first and second lead terminals 191 and 192 may be welded together.

The first and second secondary batteries C1 and C2 may be electrically connected to each other by placing mutually-facing first and second lead terminals 191 and 192 to overlap each other and welding end portions of the mutually-facing first and second lead terminals 191 and 192 that are exposed through the openings OP.

Position alignment portions 195 may be formed on the first and second lead terminals 191 and 192. The position alignment portions 195 are formed for aligning the first and second secondary batteries C1 and C2 to be coupled together. That is, when the first and second lead terminals 191 and 192 of the first and second secondary batteries C1 and C2 overlap each other and are aligned with each other, a welding current is applied to overlapping portions of the first and second lead terminals 191 and 192. At this time, the position alignment portions 195 formed on the first and second lead terminals 191 and 192 are used to align the first and second secondary batteries C1 and C2.

The first and second secondary batteries C1 and C2 may be connected in parallel with each other. For this, the first and second secondary batteries C1 and C2 may be connected by coupling together lead terminals having the same polarity. That is, the first lead terminals 191 of the first and second secondary batteries C1 and C2 may be coupled to each other, and the second lead terminals 92 of the first and second secondary batteries C1 and C2 may be coupled to each other. In this case, if the first and second secondary batteries C1 and C2 have the same structure, a first case 111 of the first secondary battery C1 and a first case 111 of the second secondary battery C2 may face the same direction. In addition, a second case 112 of the first secondary battery C1 and a second case 112 of the second secondary battery C2 may face the same direction.

Figure 5:
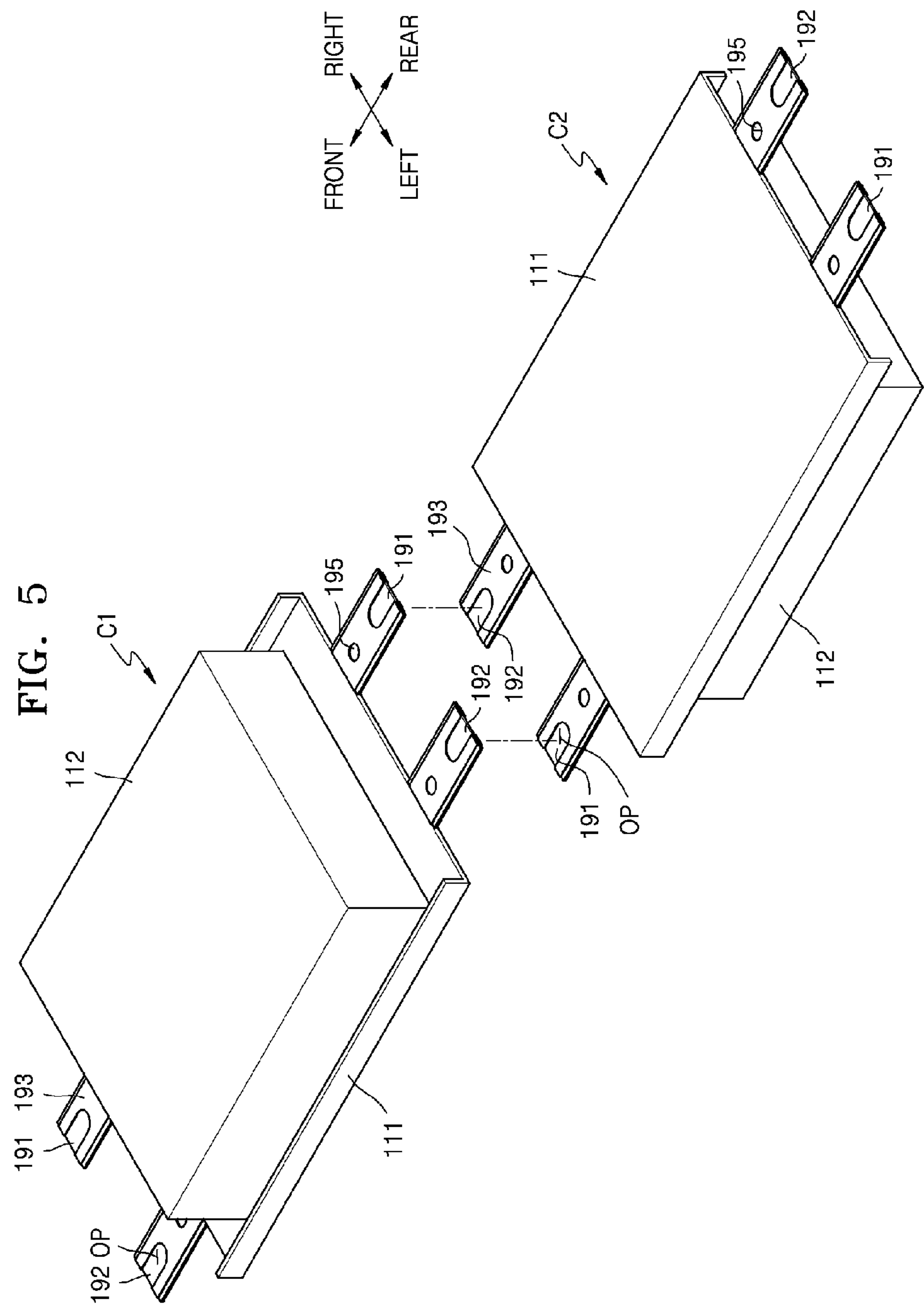
FIG. 5 is a view illustrating a secondary battery array according to another exemplary embodiment.

FIG. 5 illustrates coupling between first and second secondary batteries C1 and C2 according to another exemplary embodiment. Referring to FIG. 5, the neighboring first and second secondary batteries C1 and C2 are electrically connected to each other by coupling together first and second lead terminals 191 and 192 extending from the first and second secondary batteries C1 and C2 in mutually-facing directions. In this case, the first and second secondary batteries C1 and C2 may be connected in series with each other by connecting lead terminals having opposite polarities. For example, first and second lead terminals 191 and 192 of the first secondary battery C1 may be respectively welded to second and first lead terminals 192 and 191 of the second secondary battery C2. However, other attaching mechanism such as a Velcro, a press-fit member, a groove-protrusion pair, a screw or a rivet can also be used to connect the lead terminals 191 and 192. This applies to the FIG. 6 embodiment.

In this case, the first and second secondary batteries C1 and C2 may be oriented to face vertically opposite directions, such that a first lead terminal 191 of the first secondary battery C1 may face a second lead terminal 192 of the second secondary battery C2, and a second lead terminal 192 of the first secondary battery C1 may face a first lead terminal 191 of the second secondary battery C2. That is, the neighboring first and second secondary batteries C1 and C2 may be oriented to face opposite directions.

If the first and second secondary batteries C1 and C2 have substantially the same structure, a first case 111 of the first secondary battery C1 and a second case 112 of the second secondary battery C2 may face the same direction, and a second case 112 of the first secondary battery C1 and a first case 111 of the second secondary battery C2 may face the same direction.

Figure 6:
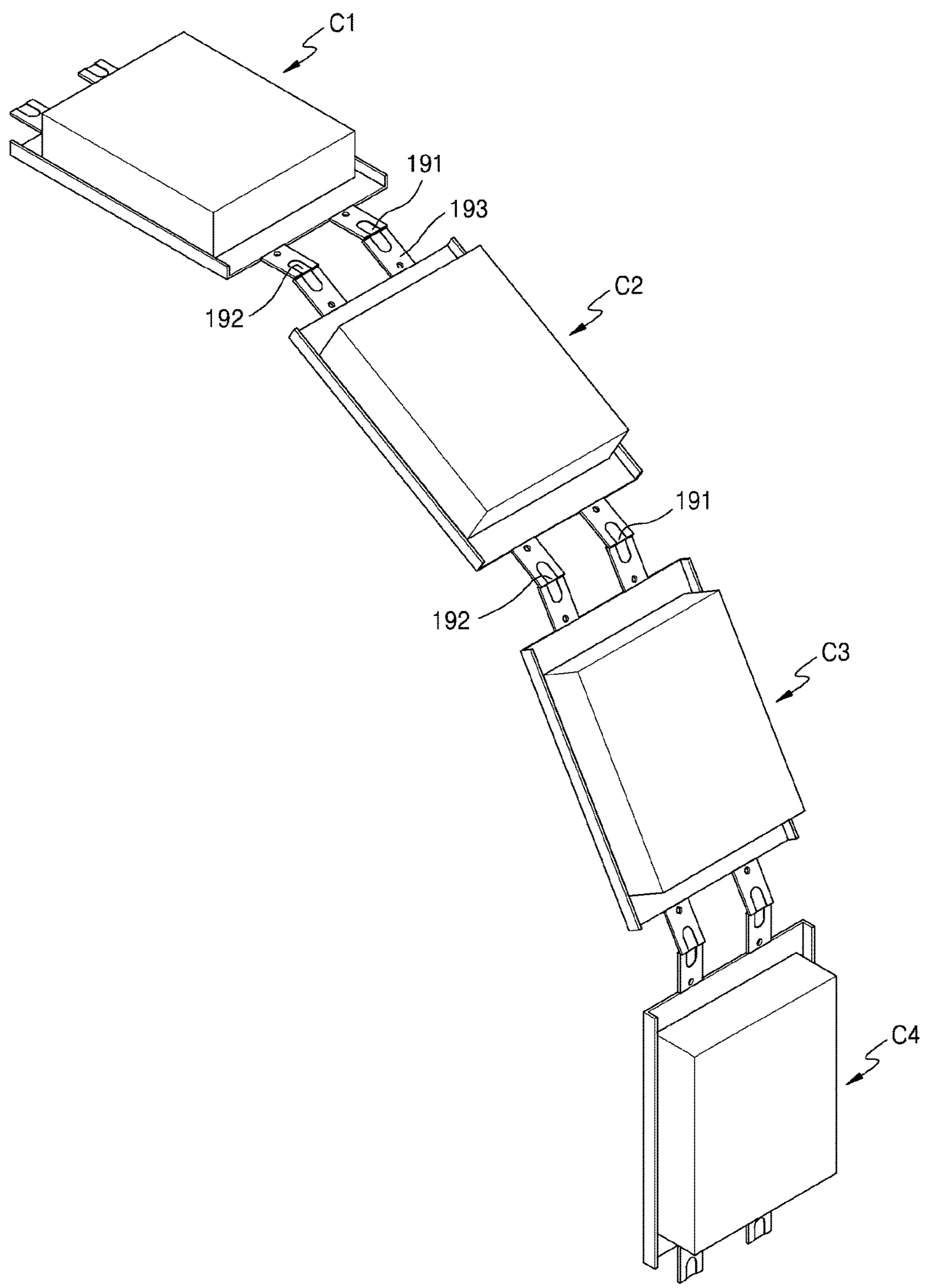
FIG. 6 is a view illustrating a secondary battery array according to another exemplary embodiment.

FIG. 6 is a view illustrating a secondary battery array according to another exemplary embodiment. Referring to FIG. 6, the secondary battery array may have a curved or non-linear shape. For example, the secondary battery array includes neighboring secondary batteries C1 to C4 that are electrically connected to each other, and the secondary battery array may be deformed in a curved shape by bending first and second lead terminals 191 and 192 connecting the secondary batteries C1 to C4. For example, the first and second lead terminals 191 and 192 connecting the secondary batteries C1 to C4 are deformed rather than electrode assemblies directly related to the electric power performance of the secondary batteries C1 to C4 being deformed, thereby obtaining a desired shape without affecting the electric power performance of the secondary battery array.

The secondary battery array may be formed in a straight shape by disposing the first and second lead terminals 191 and 192 of the neighboring secondary batteries C1 to C4 to overlap each other, and welding the first and second lead terminals 191 and 192. Then, the first and second lead terminals 191 and 192 electrically connecting the secondary batteries C1 to C4 may be bent to obtain a curved shape. At this time, although the first and second lead terminals 191 and 192 are intensively deformed, insulation members 193 surrounding the first and second lead terminals 191 and 192 may prevent the first and second lead terminals 191 and 192 from being physically damaged. For example, the insulation members 193 may distribute stress to prevent locally concentrated stress or may absorb locally concentrated stress, thereby preventing physical damage such as cracks. Although only four secondary batteries C1-C4 are shown in FIG. 6, more than four batteries can be connected to each other via the lead terminals 191 and 192.

As described above, at least one of the disclosed embodiments provides a secondary battery and a secondary battery array having a simple structure for connecting two or more secondary batteries. Furthermore, lead terminals protruding from neighboring secondary batteries in mutually-facing directions may overlap each other and be welded together so as to structurally and electrically connect the secondary batteries without using an additional connection structure.

In addition, at least one embodiment provides a secondary battery and a secondary battery array having a simple structure for connecting two or more secondary batteries in various shapes. Furthermore, a secondary battery array having a desired curved shape may be formed by freely bending lead terminals through which neighboring secondary batteries of the secondary battery array are connected. For example, since electrode assemblies directly affecting the electric power output of the secondary battery array are not deformed, the electric power output characteristics of the secondary battery array may not deteriorate even though the shape of the secondary battery array is changed.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:

1. A secondary battery comprising:

an electrode assembly;

a battery case accommodating the electrode assembly;

a plurality of lead terminals comprising a first pair of lead terminals having opposite polarities and outwardly extending from the electrode assembly to protrude from a first side of the battery case and a second pair of lead terminals having opposite polarities and outwardly extending from the electrode assembly to protrude from a second side of the battery case opposing the first side, wherein each lead terminal has an inner end directly contacting the battery case and an outer end opposing and farther than the inner end from the battery case, and wherein the inner and outer ends are located outside the battery case; and a plurality of insulation members respectively extending along the first and second pairs of lead terminals to at least partially cover the outer end of each of the lead terminals.

2. The secondary battery of claim 1, wherein a plurality of openings are formed in the insulation members and expose at least the outer ends of the lead terminals.

3. The secondary battery of claim 2, wherein a plurality of first sides of the openings are opened at the outer ends of the lead terminals.

4. The secondary battery of claim 3, wherein a plurality of second sides of the openings that are opposite the opened first sides have a semicircular shape.

5. The secondary battery of claim 2, wherein a plurality of position alignment portions are respectively formed on the lead terminals, and wherein each of the position alignment portions is smaller in size than the corresponding opening.

6. The secondary battery of claim 5, wherein each of the position alignment portions is closer to the battery case than the corresponding opening.

7. The secondary battery of claim 1, wherein a plurality of position alignment portions are respectively formed on the lead terminals.

8. The secondary battery of claim 7, wherein each of the position alignment portions has a hole shape.

9. The secondary battery of claim 1, wherein each of the insulation members covers the majority of the area of the corresponding lead terminal.

10. A secondary battery array comprising:

first and second secondary batteries each including a battery case and a plurality of first lead terminals outwardly extending from the battery case, wherein the first and second secondary batteries are electrically connected to each other via the first lead terminals, wherein each of the first lead terminals has an inner end directly contacting the corresponding one of the first and second batteries and an outer end opposing and farther than the inner end from the battery case, and wherein the inner and outer ends are located outside the battery case, wherein each of the first and second secondary batteries further comprises a plurality of first insulation members respectively extending along the first lead terminals to at least partially surround the outer end of each of the first lead terminals.

11. The secondary battery array of claim 10, wherein a plurality of openings are respectively formed in the first insulation members and expose at least the outer end of each of the first lead terminals.

12. The secondary battery array of claim 10, wherein the first lead terminals of the first and second secondary batteries are connected to each other via the outer ends thereof.

13. The secondary battery array of claim 10, wherein the first lead terminals of the first secondary battery comprise a first pair of lead terminals having opposite polarities, wherein the first lead terminals of the second secondary battery comprise a second pair of lead terminals having opposite polarities, and wherein the first and second pairs of lead terminals extend in mutually-facing directions.

14. The secondary battery array of claim 10, wherein each of the first and second secondary batteries further comprises:

an electrode assembly electrically connected to the corresponding pair of lead terminals; and first and second cases facing each other and connected to each other and accommodating the electrode assembly, wherein the first and second secondary batteries are oriented such that the first cases of the first and second secondary batteries face the same direction.

15. The secondary battery array of claim 14, wherein the orientation of the first secondary battery and the second secondary battery connected in parallel and in series are different from each other.

16. The secondary battery array of claim 10, wherein the outer ends of the first lead terminals extending from the first and second secondary batteries overlap each other and are welded together.

17. The secondary battery array of claim 16, wherein the orientation of the first secondary battery and the second secondary battery connected in parallel and in series are different from each other.

18. The secondary battery array of claim 10, wherein a plurality of position alignment portions are respectively formed on the first lead terminals so as to align positions of the first lead terminals.

19. A secondary battery comprising:

an electrode assembly;

a battery case accommodating the electrode assembly;

a plurality of lead terminals comprising at least one first lead terminal outwardly extending from the electrode assembly to protrude from a first side of the battery case and at least one second lead terminal outwardly extending from the electrode assembly to protrude from a second side of the battery case opposing the first side, wherein each of the first and second lead terminals has an inner end directly contacting the battery case and an outer end opposing and farther than the inner end from the battery case, and wherein the inner and outer ends are located outside the battery case; and a plurality of insulation members respectively extending along the first and second lead terminals to at least partially cover the outer end of each of the first and second lead terminals.

20. The secondary battery of claim 19, wherein a plurality of openings are formed in the insulation members and expose at least the outer end of each of the first and second lead terminals.

21. The secondary battery of claim 1, wherein each of the lead terminals and insulation members has a planar shape, and wherein each of the insulation members comprises upper and lower insulation member portions that are respectively formed on upper and lower surfaces of each lead terminal.

* * * * *